United States Patent

[11] 3,584,940

| | | | |
|---|---|---|---|
| [72] | Inventor | James U. Lemke | |
| | | Del Mar, Calif. | |
| [21] | Appl. No. | 772,183 | |
| [22] | Filed | Oct. 31, 1968 | |
| [45] | Patented | June 15, 1971 | |
| [73] | Assignee | Bell & Howell Company | |
| | | Chicago, Ill. | |

[54] APPARATUS FOR REPRODUCING SOUND FROM MOTION PICTURE FILM
14 Claims, 3 Drawing Figs.

[52] U.S. Cl. ................................................. 352/12,
179/100.2
[51] Int. Cl. ................................................. G03b 31/02,
G11b 5/86
[50] Field of Search ........................................... 179/100.2
E, 100.2 MP; 352/5, 12, 31

[56] References Cited
UNITED STATES PATENTS
3,049,965  8/1962  Gunst ........................... 352/5

*Primary Examiner* — Bernard Konick
*Assistant Examiner* — Robert S. Tupper
*Attorney* — Raymond A. Andrew ABSTRACT: Apparatus for reproducing sound information from a sound track of an intermittently advancing motion picture film include an erasable sound recording medium. The sound information is copied from the sound track onto the recording medium while the motion picture film and the recording medium are intermittently advancing. The recording medium with the copied sound information is then continuously advanced and the copied sound information is reproduced from the continuously advanced recording medium.

PATENTED JUN 15 1971
3,584,940
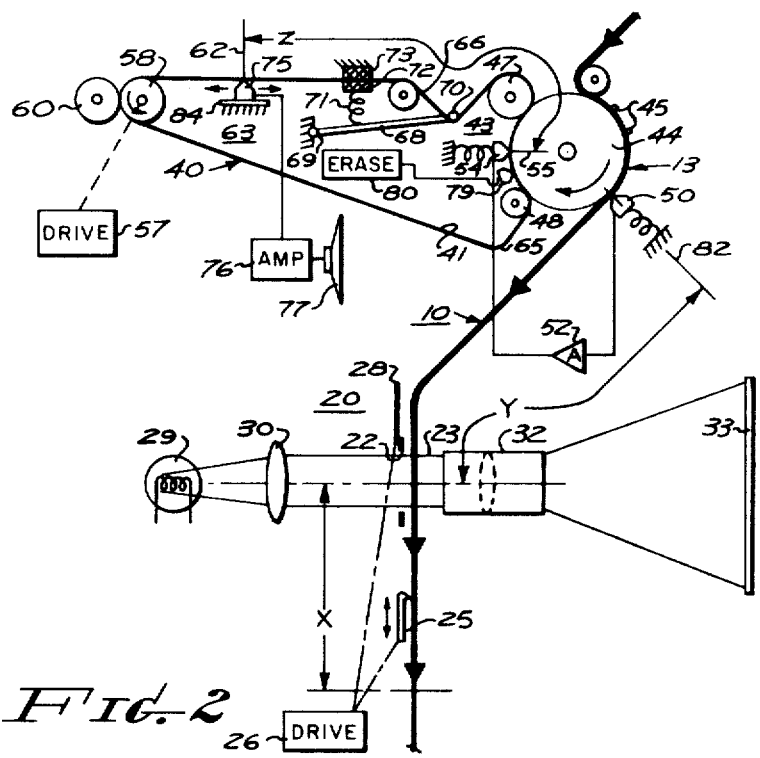
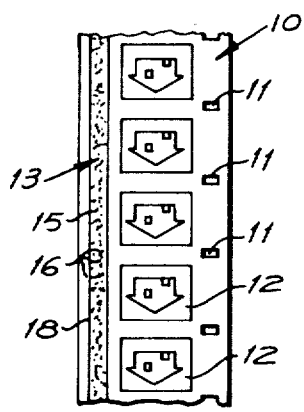
Fig. 1
PRIOR ART
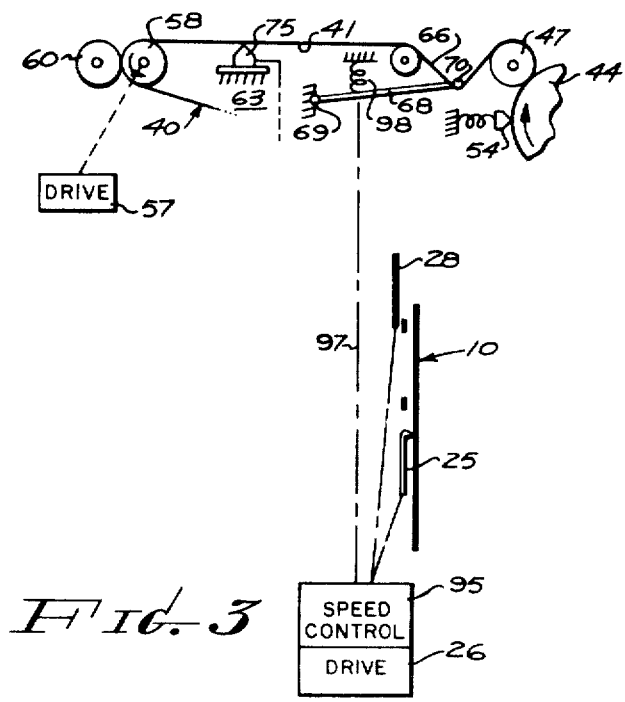
INVENTOR.
JAMES U. LEMKE

APPARATUS FOR REPRODUCING SOUND FROM MOTION PICTURE FILM

BACKGROUND OF THE INVENTION

1. Field of the Invention

The subject invention relates to information reproduction and, more specifically, to apparatus for reproducing information recorded on an information recording medium, such as a sound track of a motion picture film.

2. Description of the Prior Art

While the prior art is described with reference to the reproduction of magnetically recorded sound from motion picture film, the principles of the invention are applicable to other information reproducing processes where problems of the type to be discussed herein are encountered.

The vast majority of motion picture projectors is of the intermittent film advance type. The playback of sound from motion picture film requires, on the other hand, a continuous or linear motion of the film. It is thus customary to advance the film intermittently through the picture gate for projection, to form the film thereafter into a free loop, and to move the film thereupon continuously past a playback device by means of a sound drum having a uniform angular velocity which is imparted to the film.

As is well known in the art this requires that the sound be recorded ahead of the images as far as each sound impression and its corresponding image frame is concerned. The length of this picture-sound separation is limited by practical factors, notably the feasibility of film editing work. To name an example, the picture-sound separation is 18 frames under one industry standard.

In many situations this introduces difficulties in the required movement isolation between the intermittent and the continuous film advance, particularly if the film is of a small format, such as 8 mm. or Super-8 mm.

There thus exists a need for an improved sound-film playback system which performs well with picture-sound separations of the above-mentioned order.

A related problem arises from the fact that film editing work is considerably facilitated if there is no separation between an image and the location at which the sound for that image is recorded. Since the sound playback equipment cannot be situated at the picture gate, prior art equipment does not permit such zero picture-sound separation.

A further problem encountered with magnetic sound tracks on motion picture film stems from the stiffness of suitable film materials. As far as the motion picture film itself is concerned, a certain stiffness is desirable for improved handling and increased wear resistance. From the point of view of the reproduction of magnetically recorded sound, this is contradicted by the requirement of a plyable carrier which facilitates a functional cooperation between sound track and playback head.

SUMMARY OF THE INVENTION

The subject invention provides several apparatus each of which overcomes one or more of the above mentioned problems.

From one aspect thereof the invention provides apparatus for reproducing sound information from a sound track of an intermittently advancing motion picture film. This aspect of the invention resides in the improvement comprising, in combination, first means including an erasable sound recording medium, and second means coupled to the sound recording medium and the motion picture film for intermittently advancing successive portions of the sound recording medium and the motion picture film.

This combination further includes third means operatively coupled to the sound track and the sound recording medium for copying sound information from the sound track on the intermittently advancing motion picture film onto the intermittently advancing successive portions of the sound recording medium, fourth means coupled to the sound recording medium at a location spaced from the second means for substantially continuously advancing the successive portions of the sound recording medium with the copied information and fifth means operatively coupled to the sound recording medium for reproducing the copied information from the continuously advancing successive portions of the sound recording medium.

From another aspect thereof, the invention provides apparatus for reproducing magnetically recorded sound information from an intermittently advancing sound track on a motion picture film. This aspect of the invention resides in the improvement comprising, in combination, first means including an endless erasable recording tape, and second means coupled to the endless recording tape for intermittently advancing successive portions of the recording tape.

The latter combination further includes third means operatively coupled to the sound track and the endless recording tape for copying the sound information from the intermittently advancing sound track onto the intermittently advancing successive portions of the recording tape fourth means coupled to the endless recording tape at a location spaced from the second means for substantially continuously advancing the successive portions of the recording tape with the copied information, and fifth means operatively coupled to the recording tape for reproducing the copied sound information from the continuously advancing successive portions of the recording tape.

The operation and utility of these apparatus, as well as of embodiments thereof, will become apparent as the description proceeds.

BRIEF DESCRIPTION OF THE DRAWINGS

FIG. 1 is an elevation of a length of motion picture sound film suitable for use in the practice of the subject invention;

FIG. 2 is a schematic diagram of a motion picture projector apparatus in accordance with a preferred embodiment of the subject invention; and FIG. 3 is a schematic diagram illustrating a modification of the projector apparatus shown in FIG. 2.

DESCRIPTION OF PREFERRED EMBODIMENTS

The motion picture film 10 illustrated in FIG. 1 has conventional sprocket holes 11 for an advance of the film, and carries photographed images 12, also in a conventional fashion. In addition, a sound track 13 extends in the vicinity of and parallel to an edge 15 of the film. The sound track 13 has particles 16 of a suitable magnetic recording material, such as gamma ferric oxide, embedded in a coating 18 of a conventional binder material which may be of the type used in magnetic recording tapes.

A sound accompaniment to the scenery shown in the images 12 has been magnetically recorded on the sound track 13 with conventional means, such as a magnetic recording head (not shown). Broadly speaking, it is an object of the apparatus illustrated in FIG. 2 to reproduce the sound from the track 13 while the images 12 are sequentially displayed.

FIG. 2 shows only those parts of a motion picture projector 20 which are of interest in connection with the subject invention. In accordance with conventional practice, the motion picture film 10 is intermittently transported past an image gate 22 at a display station 23. The means for transporting the film 10 include a pulldown mechanism 25 actuated by a drive 26 which also operates a shutter 28. Light emitted by a projector lamp 29 and collimated by a condenser system 30 proceeds through the image gate 22 and the images 12 on the film 10. A projection lens system 32 projects the illuminated images on a screen 33.

The pulldown mechanism 25 intermittently advances the film 10 with the aid of the sprocket holes 11 so that the images 12 are sequentially projected. The shutter 28 is closed during each pulldown to avoid a projection of images during the intermittent movement thereof.

If the projector 20 were of a conventional type, it would employ a magnetic playback head which would contact the sound track 13 on the film 10 for a reproduction of the sound accompaniment magnetically recorded thereon. If each sound were recorded in the same region as the image to which it pertains, the playback head would have to be located at the image gate 22 for a synchronous sound playback.

In practice, this would interfere with the projection of the image frames and sound playback equipment is therefore customarily located at a distance from the gate 22. In FIG. 2, this distance, measured along the film 10, is designated as $x$ units of length. As mentioned above, the length of this distance is limited by practical factors so that it is often difficult to provide for the required isolation of movement between the intermittent film advance at the gate 22 and the continuous or uniform advance at the sound playback device.

In accordance with the illustrated preferred embodiment of the invention an endless vapors, recording tape 40 having a layer 41 of magnetic recording material deposited on the inside thereof is provided in the projector 20. As in the case of the sound track 13, the layer 41 may include particles of gamma ferric oxide.

The tape 40 is advanced intermittently with the film 13 in a copying station 43. To this effect, the intermittently advancing film 13 is wrapped around part of a drum or roller 44. If desired, the roller 44 may have sprockets which cooperate with the sprocket holes 11 of the film. Two sprockets are shown by way of example at 45. The intermittent motion imparted on the roller 44 by the film 13 is transmitted to the tape 40 which is held against the periphery of the roller 44 by means of two idlers 47 and 48. If desired, the tape 40 may be provided with sprocket holes into which the sprockets 45 penetrate for an improved transmission of the intermittent motion from the film 13 to the tape 40.

A magnetic sound playback head 50 is resiliently held against the sound track 13 on the film 10. The head 50 plays back or reproduces the sound information recorded on the track 13 by producing an electrical signal which represents such played back sound information and which is applied to the playback and recording amplifier system 52, which in addition to playback and recording amplifiers may include conventional high frequency biasing equipment for permitting linear rerecording of the signal. After amplification, such electrical signal is applied to a magnetic recording head 54 which is resiliently held against the recording layer 41 on the tape 40 at a location 55.

A tape drive 57 rotates a capstan 58 and a pinch roller 60 cooperates with the capstan 58 in transporting the endless tape 40 so that each recorded sound element is transported from the location 55 in the information copying station 43 to a location 62 in an information playback station 63. While the tape 40 is advanced intermittently through the copying station 43, it is moved continuously, that is at uniform velocity, through the playback station 63. To enable this operation, loops 65 and 66 are permitted to develop in the tape 40. A movable arm 68 is mounted on a pivot 69 and carries at its free end a roller 70 which engages the tape 40. The movable arm 68 carries a spring 71 which presses a felt pad 72 against the tape 40. As shown in FIG. 2, the tape 40 travels between the movable pad 72 and a stationary felt pad 73.

If the tape loop 66, which is of variable size, is long, the arm 68 is swung downwardly so that the pressure of the pads 72 and 73 against the tape 40 is low, whereby the capstan 58 is able to advance the tape at high velocity, that is without braking on the tape. This shortens the loop 66 so that the arm 68 is swung upwardly about the pivot 69. This increases the pressure of the pads 72 and 73 on the tape 40 thereby causing a braking of the tape and a decrease in the tape speed through the playback station 63. In this manner, the arm 68 with spring 71 and pads 72 and 73 acts as a control device which regulates the speed of the tape through the playback station 63 in accordance with the frame rate at which the film 10 is advancing through the film gate 22.

The continuously or uniformly advanced tape 40 in the playback station 63 is pulled past a magnetic playback head 75 which contracts the magnetic recording layer 41 and which plays back the sound information which has been copied from the sound track 13 on the film 10 onto the magnetic tape 40 at the copying station 43. The resulting electrical signal is amplified at 76 and is made audible by a loudspeaker 77. In this manner, the sound accompaniment is reproduced continuously despite the intermittent motion of the film 10.

The played-back sound information is continuously erased from the tape 40 by a magnetic erasing head 79 which is energized from a conventional source 80 of erasing oscillations.

To provide for a synchronous playback of the sound, the playback head 75 is located at a distance of $z$ units of length, which is measured along the tape 40, from the location 55 at which the sound information is recorded on the tape 40. This distance $z$ is equal to the sum of the distances $x$ and $y$, wherein $x$ is the above-mentioned picture-sound separation, while $y$ is the distance, measured along the film 10, between the center of the film gate 22 and a location 82 at which the sound information is played back from the sound track 13 on the film 10 by the playback head 50. The sound synchronism may be made adjustable by mounting the playback head 75 on a position adjustment device 84 for adjustment of the pickup location 62 in the direction of either of the two arrows shown adjacent the head 75. This also permits the position of the head 75 to be adjusted to different picture-sound separation standards.

To improve the quality of the played-back sound, the tape 40 is preferably made more flexible than the film 10. Magnetic recording tapes which have a lower stiffness than customary film stock are well known and widely used in the art of magnetic tape recording.

It will now be recognized that the illustrated embodiment of the subject invention does away with the above-mentioned problems posed with prior art apparatus by relatively short picture-sound separations. In fact, if the above mentioned distance $z$ is made equal to $y$, each sound element can be recorded adjacent the image frame to which it pertains. This location-synchronous recording of sound on the track 13 materially facilitates editing work on the motion picture film.

Because of the possibility of achieving zero picture-sound separation or of making the film 40 more flexible than the film 10, the principles of the subject invention may also be applied to such apparatus as motion picture projectors with continuous film motion. Projectors of this type are well known in the art. Briefly, they customarily include some optical means, such as an oscillating mirror or a rotating prism, which compensates for the continuous film motion.

If desired, the magnetic recording on the sound track 13 may be copied from such track onto the tape 40 by one of the tape-to-tape copying methods disclosed in my copending Pat. application Ser. No. 696,601, entitled "Apparatus for Magnetically Copying Information," filed Jan. 9, 1968, and assigned to the assignee of the subject application. As has been extensively described in that application, a magnetic recording may be copied from a master tape (see sound track 13) onto a copy tape (see tape 40) by copying the magnetic recording by thermoremanent magnetization from the master tape onto an endless medium of low-Curie point recording material, such as chromium dioxide, and by further copying the recording from the latter medium onto the copy tape with the aid of anhysteretic magnetic fields. On the other hand, anhysteretic magnetic fields may be used without thermoremanent magnetization for copying the sound track 13 onto the tape 40. In this case, successive portions of the sound track 13 on the film 10 are brought into contact with successive portions of the recording layer 41 on the tape 40 and these mutually contacting portions are moved through decaying magnetic fields to obtain magnetic copying of the type as known in the magnetic tape-to-tape copying art.

The apparatus shown in FIG. 3 is identical to that illustrated in FIG. 2 except for the differences set forth below. Accordingly, only parts necessary to the understanding of the modification presently to be discussed are illustrated in FIG. 3, and like reference numerals are employed to designate like parts as among FIGS. 2 and 3.

According to FIG. 3, the projector drive 26 is provided with a speed control 95. Speed controls for projectors are well known and include, for instance, either resistor means for varying the power supplied to the projector motor, or variable transmission means coupled between the projector motor and the projector mechanism for varying the speed with which the mechanism is driven by the motor.

A link 97 is provided between the movable arm 68, which is biased downwardly by a spring 98, and the speed control 95. The link 97 causes adjustment of the speed control 95 in accordance with movements of the arm 68 so that the speed of the film 10 is increased when the loop 66 tends to become smaller, and is decreased when the loop 66 tends to become larger. In other words, the arm 68, speed control 95 and link 97 cooperate in maintaining the size of the loop 66 by controlling the speed of the film 10 so that the tape 40 is driven at constant speed or rate of advance past the playback head 75 by the drive 57 and capstan 58.

The embodiment of FIG. 3 is more advantageous in situations in which operation of the braking mechanism (felt pads 72 and 73) shown in FIG. 2 would lead to undesirable variations in the pitch of the played-back sound.

I claim:

1. In apparatus for reproducing sound information from a sound track of an intermittently advancing motion picture film, the improvement comprising in combination:
    first means including an erasable sound recording medium;
    second means coupled to said sound recording medium and said motion picture film for intermittently advancing successive portions of said sound recording medium and said motion picture film with said sound track;
    third means operatively coupled to said sound track and said sound recording medium for copying sound information from said sound track on said intermittently advancing motion picture film onto said intermittently advancing successive portions of said sound recording medium;
    fourth means coupled to said sound recording medium at a location spaced from said second means for substantially continuously advancing said successive portions of said sound recording medium with said copied information; and
    fifth means operatively coupled to said second recording medium for reproducing said copied information from said continuously advancing successive portions of said sound recording medium.

2. Apparatus as claimed in claim 1, wherein said second means include motion transmitting means coupled to said motion picture film and said sound recording medium for intermittently advancing said sound recording medium in accordance with the movement of said intermittently advancing motion picture film.

3. Apparatus as claimed in claim 1, wherein said third means includes means for reproducing said sound information from said sound track on said intermittently advancing motion picture film and means connected to said reproducing means for copying said reproduced information onto said intermittently advancing successive portions of said sound recording medium.

4. Apparatus as claimed in claim 1, wherein said third means include playback means operatively associated with said sound track on said intermittently advancing motion picture film for reproducing an electrical signal corresponding to sound information in said sound track of said intermittently advancing motion picture film, and recording means connected to said playback means for recording information contained in said electrical signal onto said intermittently advancing successive portions of said sound recording medium.

5. Apparatus as claimed in claim 1, including means for forming a variable loop of said sound recording medium between said second and fourth means, and means responsive to variations of said loop for controlling the speed of said sound recording medium at said fifth means.

6. Apparatus as claimed in claim 1, including means for forming a variable loop of said sound recording medium between said second and fourth means, and means responsive to variations of said loop for controlling the rate of advance of said first recording medium.

7. Apparatus as claimed in claim 1, wherein said fifth means include means for varying the location at which said copied information is reproduced from said continuously advancing successive portions of said sound recording medium.

8. In apparatus for reproducing magnetically recorded sound information from an intermittently advancing sound track on a motion picture film, the improvement comprising in combination:
    first means including an endless erasable recording tape;
    second means coupled to said endless recording tape for intermittently advancing successive portions of said recording tape;
    third means operatively coupled to said sound track and said endless recording tape for copying sound information from said intermittently advancing sound track onto said intermittently advancing successive portions of said recording tape;
    fourth means coupled to said endless recording tape at a location spaced from said second means for substantially continuously advancing said successive portions of said recording tape with said copied information; and
    fifth means operatively coupled to said recording tape for reproducing said copied sound information from said continuously advancing successive portions of said recording tape.

9. Apparatus as claimed in claim 8, wherein said second means include motion transmitting means coupled to said sound track and said recording tape for intermittently advancing said recording tape in accordance with the movement of said intermittently advancing sound track.

10. Apparatus as claimed in claim 8, wherein said motion picture film has a first stiffness and said recording tape has a second stiffness lower than said first stiffness.

11. Apparatus as claimed in claim 8, wherein said third means include playback means for electrically reproducing said sound information from said intermittently advancing sound track and recording means connected to said playback means and coupled to said endless recording tape for producing a copy of said sound information on said intermittently advancing successive portions of said recording tape.

12. Apparatus as claimed in claim 8, including means for forming a variable loop of said recording tape between said second and fourth means, and means responsive to variations of said loop for controlling the speed of said recording tape at said fifth means.

13. Apparatus as claimed in claim 8, including means for forming a variable loop of said recording tape between said second and fourth means, and means responsive to variations of said loop for controlling the rate of advance of the motion picture film.

14. Apparatus as claimed in claim 8, wherein said fifth means include means for varying the location at which said copied sound information is reproduced from said continuously advancing successive portions of said recording tape.